US012712992B1

(12) United States Patent
Ittelson et al.

(10) Patent No.: US 12,712,992 B1
(45) Date of Patent: Aug. 18, 2026

(54) VIEWING ANGLE-BASED CONTENT PRESENTATION

(71) Applicant: Zoom Communications, Inc., San Jose, CA (US)

(72) Inventors: Brendan James Ittelson, San Jose, CA (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 209 days.

(21) Appl. No.: 18/336,108

(22) Filed: Jun. 16, 2023

(51) Int. Cl.
*H04N 13/117* (2018.01)
*H04N 13/302* (2018.01)
*H04N 13/368* (2018.01)
*H04L 65/403* (2022.01)

(52) U.S. Cl.
CPC ......... *H04N 13/117* (2018.05); *H04N 13/302* (2018.05); *H04N 13/368* (2018.05); *H04L 65/403* (2013.01)

(58) Field of Classification Search
CPC .. H04N 13/117; H04N 13/302; H04N 13/368; H04L 65/403
See application file for complete search history.

(56) References Cited

U.S. PATENT DOCUMENTS 10,789,912 B2 9/2020 Anderson
11,165,789 B1 * 11/2021 Smith ..................... G06F 9/542
11,169,603 B2 11/2021 Huang et al.
2015/0181258 A1 6/2015 Kim et al.
2016/0364087 A1 * 12/2016 Thompson ........... H04N 13/351
2017/0045935 A1 2/2017 Bostick et al.
2018/0115772 A1 * 4/2018 Thompson ........... H04N 13/351

FOREIGN PATENT DOCUMENTS

CA 2862989 A1 * 7/2013 ........... G06T 11/001
DE 102018217028 A1 * 4/2020 ........... H04N 9/3173
KR 101874938 B1 * 7/2018 ....... H04N 21/43615
WO WO-2022058541 A1 * 3/2022 ............. G02B 30/27

OTHER PUBLICATIONS

Delta News Hub, The Parallel Reality Experience, https://news.delta.com/mediakit/parallel-realitytm-experience, Jul. 15, 2022, 2 pages.

* cited by examiner

*Primary Examiner* — Shadan E Haghani
(74) *Attorney, Agent, or Firm* — Young Basile Hanlon & MacFarlane. P.C.

(57) ABSTRACT

Different visual content simultaneously output for viewing to different people within a physical location (e.g., a conference room) is determined based on viewing angles of those people relative to a display of the physical location. In one approach, viewing angles of conference participants are determined with respect to a three-dimensional glasses-less display within a physical location. First content to output at the three-dimensional glasses-less display for viewing by a first set of the conference participants is determined. Second content to output at the three-dimensional glasses-less display for viewing by a second set of the conference participants is determined. The three-dimensional glasses-less display is then caused to simultaneously output the first content and the second content in a manner that limits visibility of the first content to the first set of the conference participants and visibility of the second content to the second set of the conference participants.

20 Claims, 10 Drawing Sheets

VIEWING ANGLE-BASED CONTENT PRESENTATION

FIELD

This disclosure generally relates to content presentation, and, more particularly, to the simultaneous presentation of different content to persons within in a physical location based on their specific viewing angles relative to a display within the physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
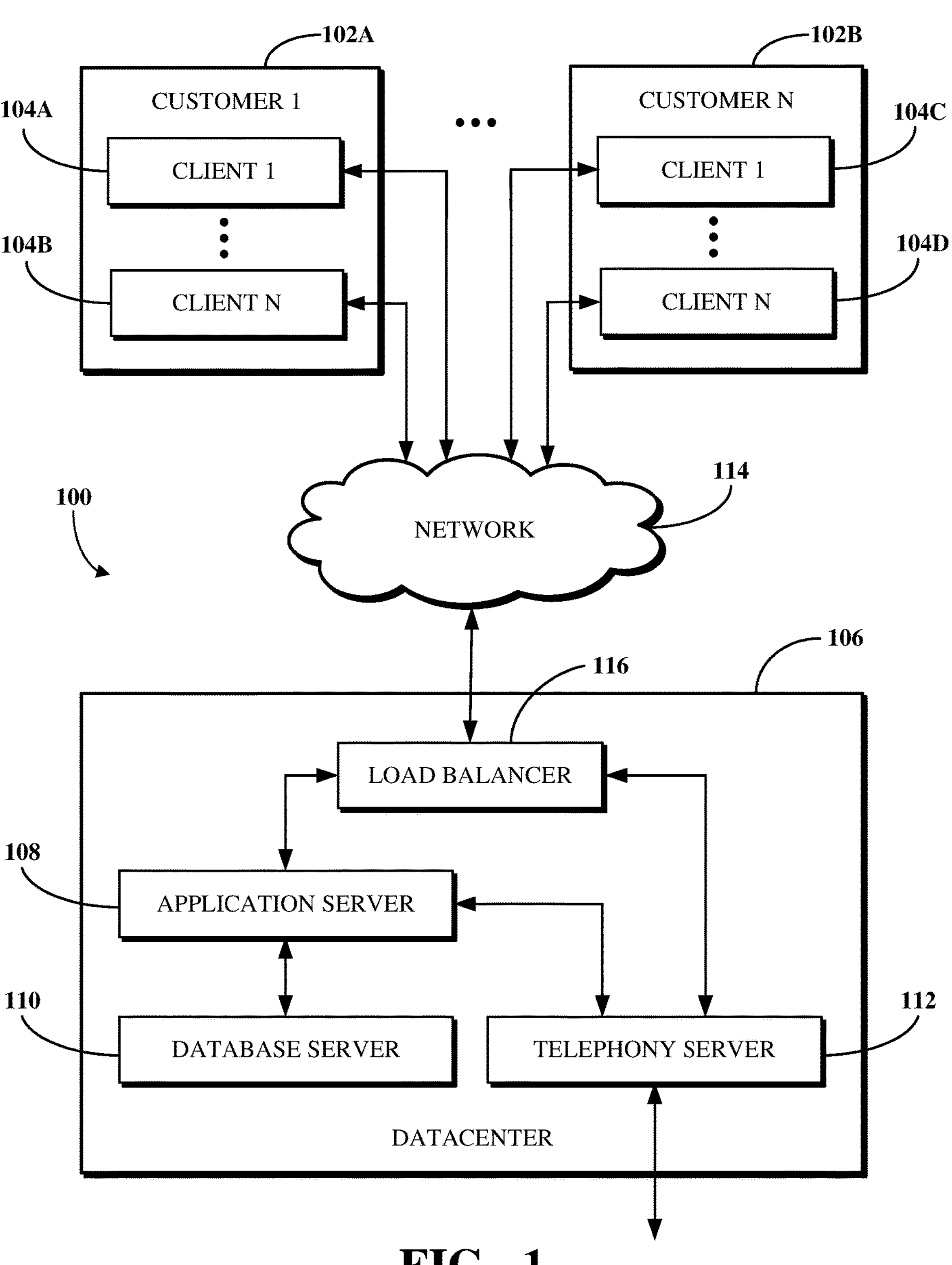
FIG. 1 is a block diagram of an example of an electronic computing and communications system.

Conferencing software is frequently used across various industries to support video-enabled conferences, hereafter referred to as video conferences, between participants in multiple locations. In some cases, each of the conference participants separately connects to the conferencing software from their own remote locations. In other cases, one or more of the conference participants may be located in and participate in a video conference implemented using the conferencing software from a physical location (e.g., a conference room, a classroom, a home office, or another indoor or outdoor room or space) while other conference participants may participate in the video conference from one or more remote locations external to that physical location. Conferencing software thus enables people to conduct video conferences without requiring them to be physically present with one another. Conferencing software may be available as a standalone software product or it may be integrated within a software platform, such as a unified communications as a service (UCaaS) platform.

Conventional video conferencing involves outputting, within a shared graphical user interface (GUI) to which each participant has access, one or more streams of video content for all participants to simultaneously view. In particular, a single display (e.g., a television or computer monitor) within a physical location (i.e., any internal or external area within which multiple people may be located while they participate in a same video conference, regardless of numbers of walls, for example, a conference room, an office, a lecture hall, or an auditorium) is generally used to output the video content of a video conference for viewing to all in-person conference participants who are all located in the physical location. In this way, all of the in-person conference participants, as well as anyone else who may gain access to the physical location during the video conference, will have an identical video conference experience because they are all presented with the same video content throughout the entirety of the video conference.

While this conventional approach is opportune for many video conference experiences, it suffers drawbacks that limit the efficacy and/or security of other video conference experiences. For example, because the same video content is exposed to all in-person conference participants, any sensitive video contents may be viewed by in-person conference participants and/or other persons who should not have access thereto (e.g., people from different teams or organizations than the team or organization to which the sensitive video contents correspond, or people who are able to view the display through a window or glass wall of the room in which the in-person conference participants are located). Thus, hosts or presenters must either avoid including sensitive video contents in such video conferences or risk the exposure of those contents to unauthorized parties. Furthermore, private messages intended for viewing by only select in-person conference participants are exposed to anyone who can view the display. In another example, because the same video content is presented for viewing by all in-person conference participants simultaneously at the same display, conventional video conferencing approaches effectively limit the potential amount of content which could otherwise be simultaneously output at that single display. Thus, to deliver all desired content during a video conference, the video conference time must be extended or the amount of time spent on the various individual content items must be decreased. Furthermore, in many cases, a non-trivial amount of time during the video conference may be wasted because some of the video content may be irrelevant to certain in-person conference participants.

Implementations of this disclosure address problems such as these by simultaneously presenting video content for individual in-person conference participants or certain groups of in-person conference participants based on their viewing angles relative to a display at which the video content is output. Positional information for in-person conference participants located in a physical location is determined and used to control the content visibly output to them. In particular, in at least some implementations, a three-dimensional glasses-less display is leveraged within the physical location to simultaneously present multiple discrete images to different in-person conference participants based on their locations within the physical location, thereby enabling customized or otherwise different video content experiences for those participants during the same video conference and using the same display. Separate viewing zones, each corresponding to a different horizontal or vertical viewing angle relative to the display, may thus be determined and used to deliver different video content to participants located thereat. In one non-limiting example, a first zone may correspond to a left side of a room, a second zone may correspond to a center of the room, and a third zone may correspond to a right side of the room.

To describe some implementations in greater detail, reference is first made to examples of hardware and software structures used to implement a system for viewing angle-based content presentation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
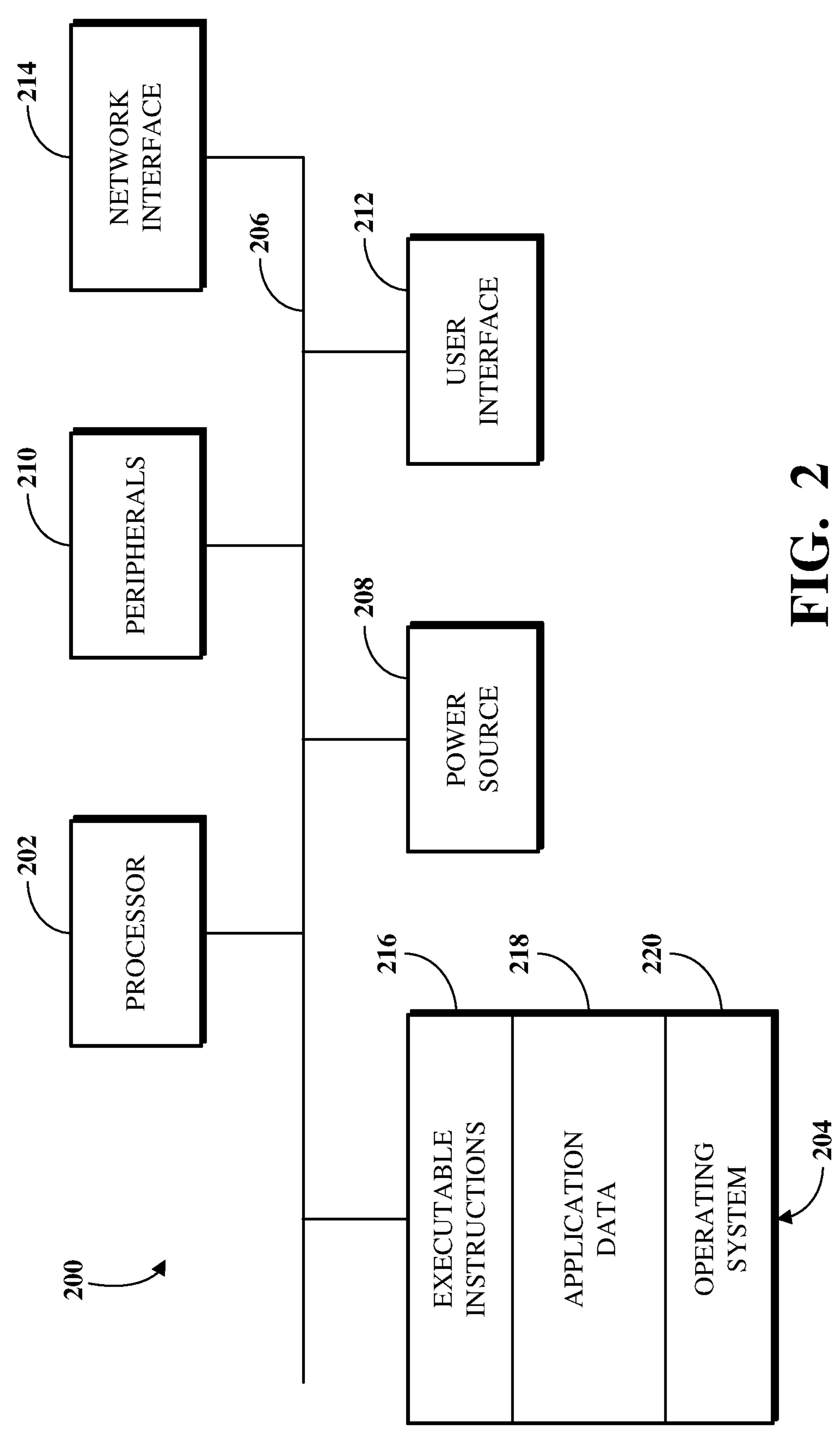
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
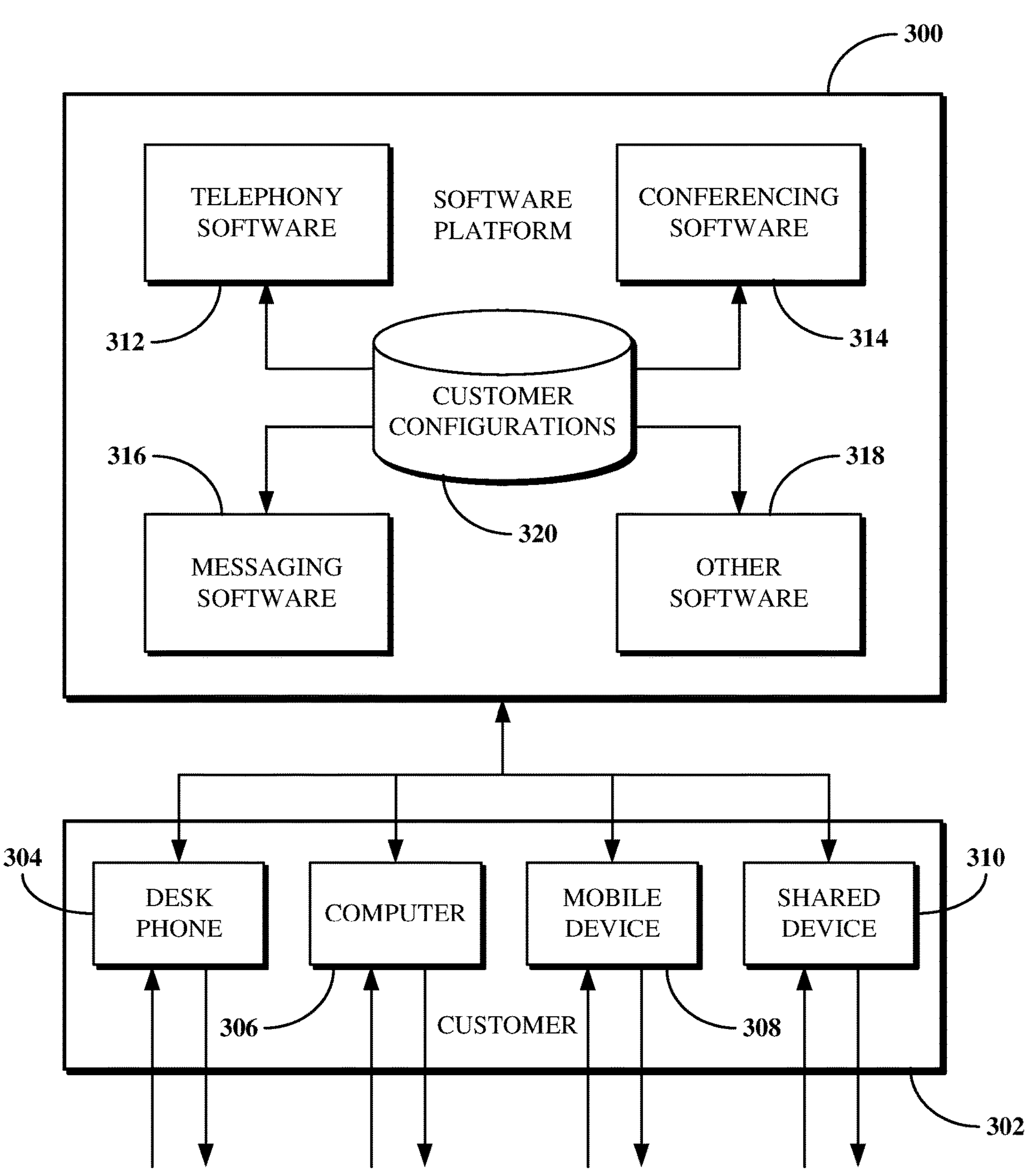
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include content presentation software, for example, for simultaneously presenting visual content for display to different conference participants within a physical location based on viewing angles of those participants relative to a display at which the content is output. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
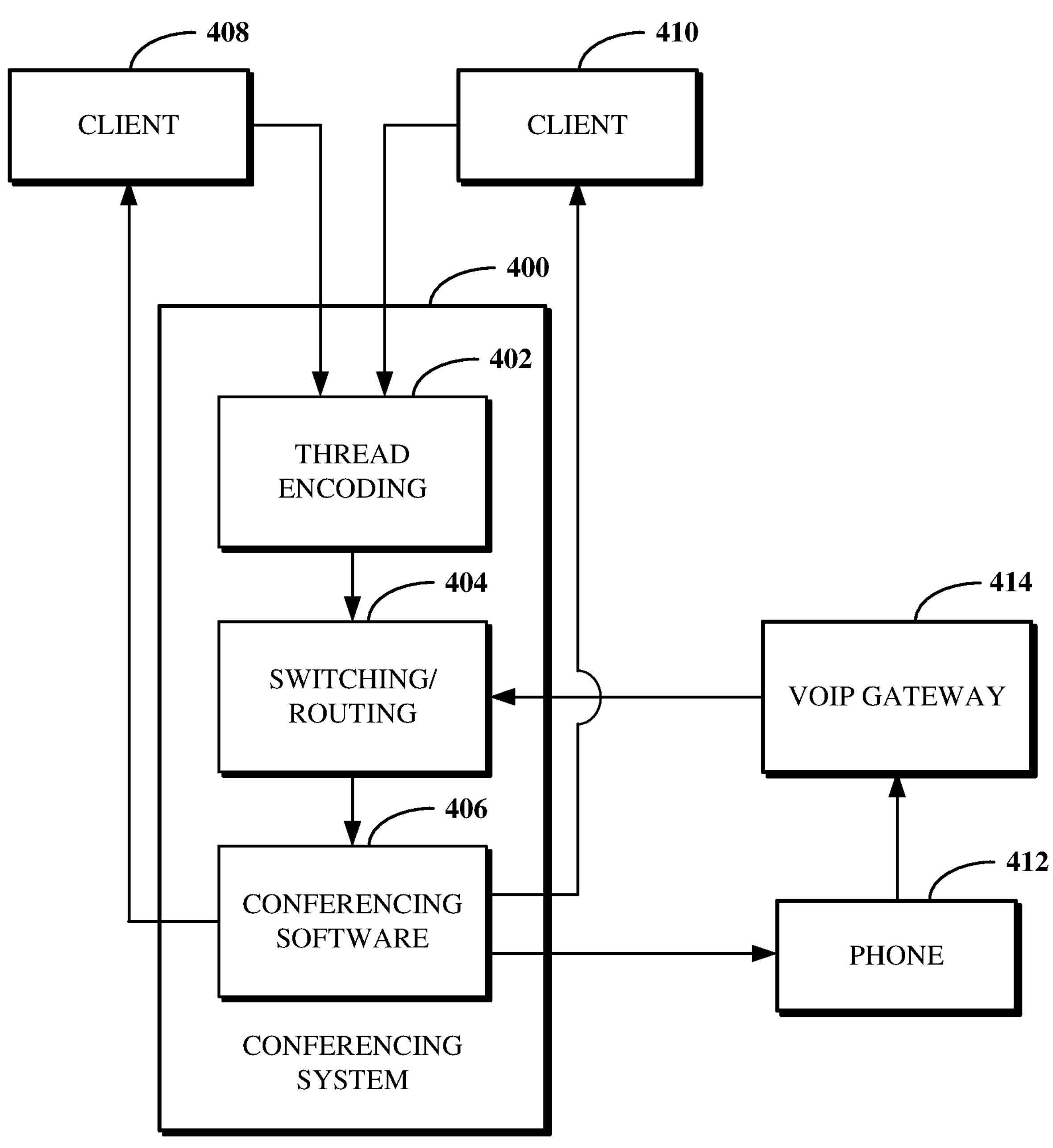
FIG. 4 is a block diagram of an example of a conferencing system.

FIG. 4 is a block diagram of an example of a conferencing system 400, for example, for delivering conferencing software services in an electronic computing and communications system (e.g., the system 100 shown in FIG. 1). The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

The conferencing system 400 may be used to implement a video conference in any of a variety of possible use cases. For example, the conferencing system 400 can implement a participant-to-participant video conference in which participants as end users of the conferencing software 406 may have their own user interface tiles and video streams, connect from their own participant devices (e.g., the client 408 or the client 410), have similar meeting controls, be or be granted host privileges, or the like. A participant-to-participant video conference as referred to herein may thus be recognized as a conventional video conference between two or more given people. In another example, the conferencing system 400 can implement a contact center engagement video conference in which one participant to the video conference is a contact center user who is accessing a contact center over a video modality facilitated wholly or partially using the conferencing software 406 and another participant to the video conference is a contact center agent who works with or otherwise for the contact center to address queries from contact center users. In some such cases, the conferencing system 400 may be implemented within a contact center service to deliver real-time communications over a video modality of the contact center. In yet another example, the conferencing system 400 can implement an online learning video conference in which multiple participants are recognized generally as audience participants and one or more select participants are recognized generally as leader participants. An online learning video conference may, for example, be used for educational purposes (e.g., virtual classes for online-capable schools), webinar purposes, or other lecture- or presentation-type purposes. Other examples of video conferences implementable using the conferencing system 400 are possible.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
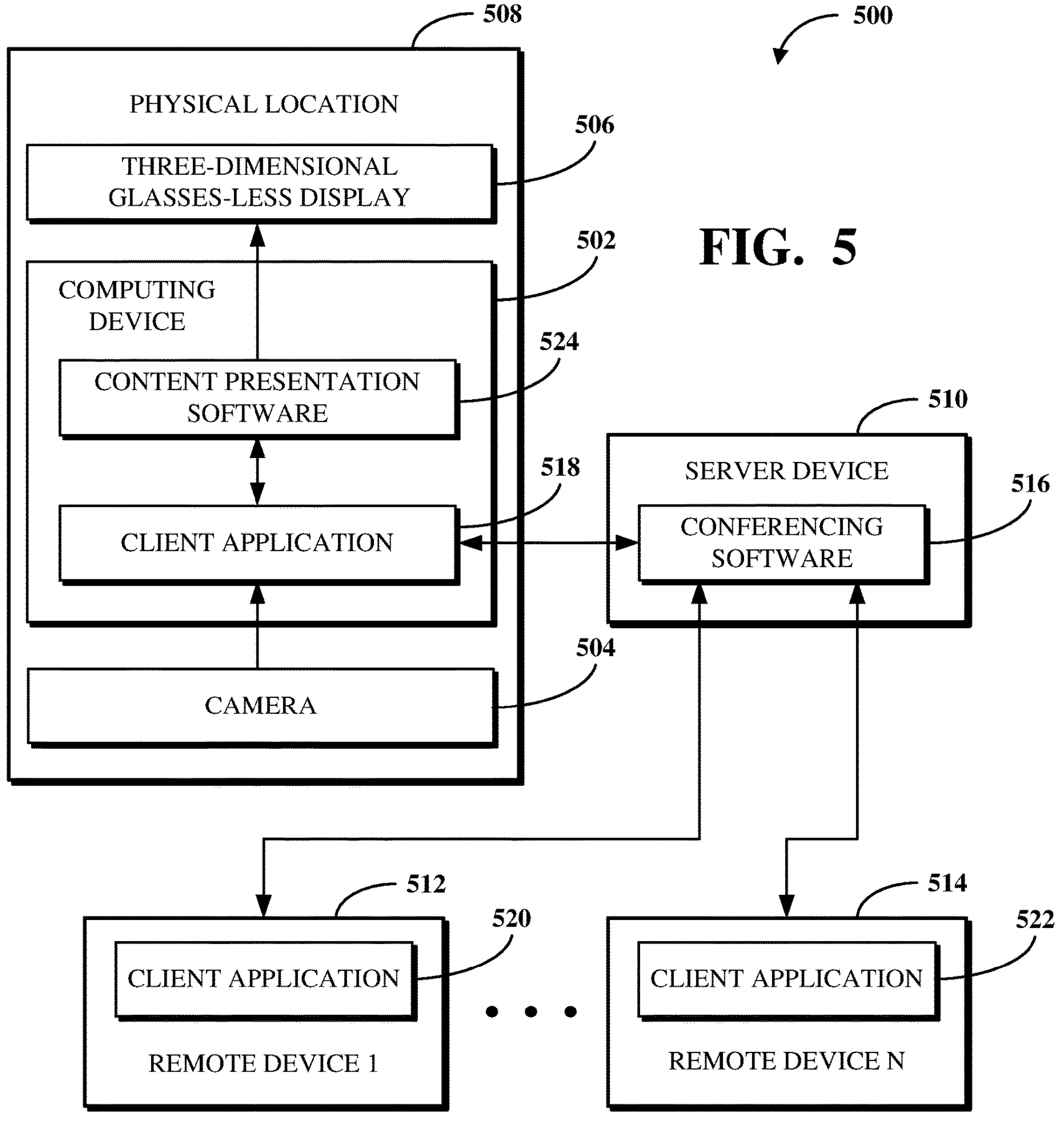
FIG. 5 is a block diagram of an example of a system for viewing angle-based content presentation.

FIG. 5 is a block diagram of an example of a system 500 for viewing angle-based content presentation. The system 500 includes a computing device 502, a camera 504, and a three-dimensional glasses-less (3DGL) display 506 all within a physical location 508. The system 500 further includes a server device 510 and one or more remote devices 512 through 514 all external to the physical location 508.

The computing device 502 is used by in-person conference participants located in the physical location 508 to connect to a video conference implemented by conferencing software 516 (e.g., the conferencing software 314 shown in FIG. 3 or the conferencing software 406 shown in FIG. 4, to the extent different) at the server device 510. The remote devices 512 through 514, shown as being remote device 1 through remote device N in which N is an integer greater than or equal to 1, are used by one or more remote conference participants located external to the physical location 508 to connect to the same video conference. For example, the computing device 502 may run a client application 518 that connects to the conferencing software 516 to enable the in-person conference participants to access the video conference from the computing device 502. Similarly, the one or more remote devices 512 through 514 may each run a client application (as shown, the remote device 1 512 runs a client application 520 and the remote device N 514 runs the client application 522) that connects to the conferencing software 516 to enable the respective remote conference participants to access the video conference using those remote devices 512 through 514. The client applications 518, 520, and 522 may, for example, be different installations, instantiations, and/or versions of software usable to access one or more software services of a software platform (e.g., a UCaaS platform, such as the software platform 300 shown in FIG. 3).

While the computing device 502 and the one or more remote devices 512 through 514 are shown and described as running client applications 518, 520, and 522 and thus may be considered client devices, in some cases, one or more of those devices 502 or 512 through 514 may be other than a client device. For example, the remote device 1 512 may access a video conference by the conferencing software 516 using a web browser running at the remote device 1 512 where the remote device 1 512 does not include a client application. While a particular number of such devices are shown as connecting to a video conference implemented by the conferencing software 516 in a non-limiting example, in some implementations, other numbers of devices may be so connected.

The 3DGL display 506 is a television, monitor, or other display device configured to output visual content (i.e., image or video content) of the video conference for viewing to the in-person conference participants within the physical location 508. In particular, the 3DGL display 506 is configured to output different visual content to different in-person conference participants based on the viewing angles of those in-person conference participants with respect to the 3DGL display 506. In one non-limiting example, the 3DGL display 506 may leverage a number of lens or mirror sets, arranged vertically or horizontally about the 3DGL display 506, that bend light output using one or more lighting elements of the 3DGL display 506 to cause different visual content to be visible at different viewing angles around the physical location 508. Thus, different in-person conference participants within the physical location 508 may concurrently be presented with different visual content in which the visual content presented to one in-person conference participant is inaccessible to the visual content presented to another in-person conference participant who is located at a different viewing angle relative to the 3DGL display 506.

The viewing angles from which different visual content output at the 3DGL display 506 may be concurrently visible correspond to different viewing zones within the physical location 508, relative to a location of the 3DGL 506 within the physical location 508, at each of which one or more of the in-person conference participants may be sitting, standing, or otherwise present during some or all of the subject video conference. In particular, there are at least two viewing angles, and thus at least two viewing zones each corresponding to a different viewing angle, within the physical location 508. As will be described below, the particular number of viewing angles, and the locations of the viewing zones to which each of the different viewing angles corresponds, may be determined based on one or more of the number of people and/or devices within the physical location, the specific people and/or devices within the physical location, characteristics of the physical space 508 (e.g., locations of furniture and/or windows or other transparent surfaces), and/or other criteria. In some cases, the viewing angles may be predetermined (e.g., before a subject video conference begins or is scheduled to begin) and/or static for the physical location 508. In some cases, the viewing angles may be determined when the subject video conference begins (or is scheduled to begin) and/or dynamic (e.g., based on the people and/or devices identified within the physical location 508).

The computing device 502 runs content presentation software 524 which interfaces with the client application 518 to control the delivery of different visual content for viewing angle-based output using the 3DGL display 506. Thus, using the content presentation software 524, different visual content is simultaneously output at the 3DGL display 506 for viewing by people located within different viewing zones of the physical location 508, according to the viewing angles determined for the physical space 508. For example, first visual content determined based on a first viewing angle is different from second visual content determined based on a second viewing angle. Furthermore, the first visual content is output at the 3DGL display 506 according to the first viewing angle so as to limit the visibility of the first visual content from viewing angles other than the first viewing angle, while the second visual content is output at the 3DGL display 506 according to the second viewing angle so as to limit the visibility of the second visual content from viewing angles other than the second viewing angle. The 3DGL display 506, via the content presentation software 524, may simultaneously output multiple visual content items according to one or more techniques. For example, the 3DGL display 506 may simultaneously output different video streams each corresponding to the visual content determined for individual viewing angles. In such a case, banded mirrors, lenses, or other componentry of the 3DGL display 506 is used to simultaneously output the different video streams. In another example, the 3DGL display 506 may output a single video stream compiled to include all of the different visual content determined for the individual viewing angles, in which instructions used to compile the single video stream indicate which video stream contents correspond to which viewing angles to juxtapose the corresponding visual contents accordingly. In some implementations, the simultaneous output of different visual content may refer to some viewing angles being presented with visual content while others are not.

Figure 6:
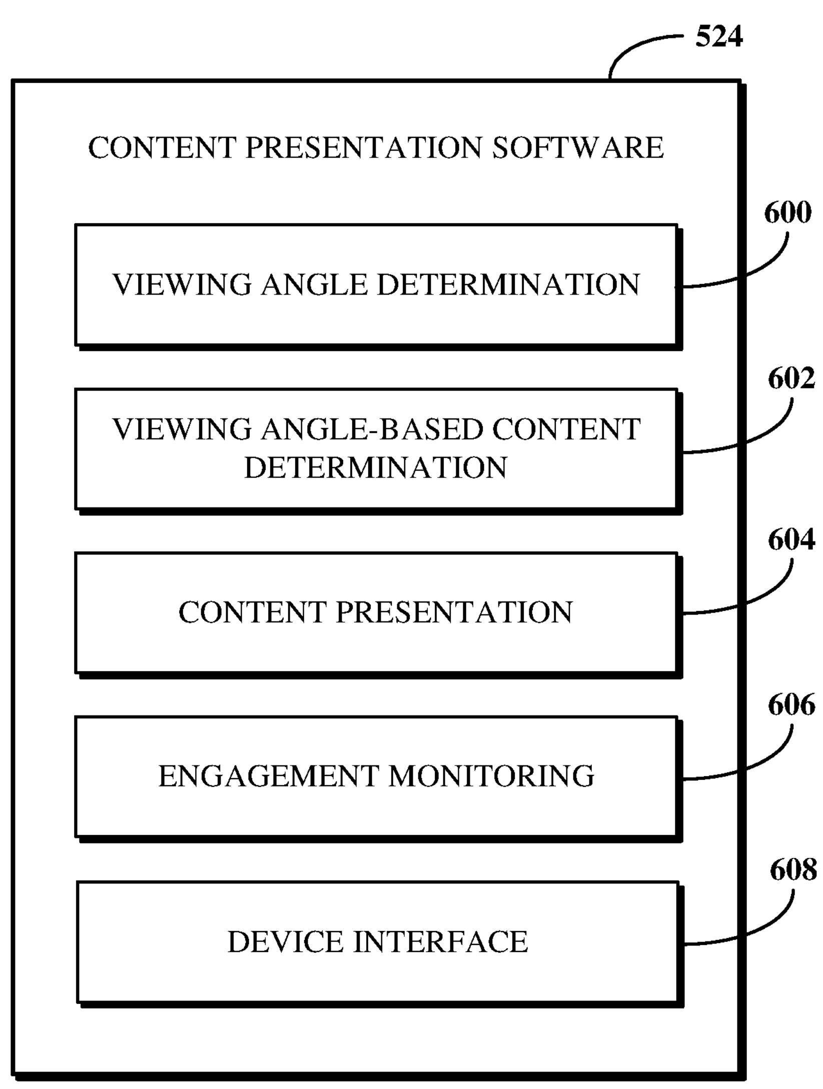
FIG. 6 is a block diagram of an example of functionality of content presentation software.

The content presentation software 524 will be further described with reference to FIG. 6. FIG. 6 is a block diagram of an example of functionality of the content presentation software 524. The content presentation software 524 includes tools, such as programs, subprograms, functions, routines, subroutines, operations, and/or the like, for simultaneously presenting visual content as output for display to different conference participants within a physical location based on viewing angles of those participants relative to a display at which the content is output. As shown, the content presentation software 524 includes a viewing angle determination tool 600, a viewing angle-based content determination tool 602, a content presentation tool 604, an engagement monitoring tool 606, and a device interface tool 608.

The viewing angle determination tool 600 determines the two or more viewing angles for which to simultaneously output different visual content to different sets of one or more persons within a physical space during a video conference. The viewing angle determination tool 600 can determine the viewing angles using a predetermined configuration for the physical space, such as where the viewing zones within the physical location are to remain static. For example, an administrator or other software user may define (e.g., create, push, assert, or otherwise cause to be enforced) a configuration indicating a certain number of viewing zones within the physical location, in which each viewing zone is associated with a different angle relative to the display of the physical location. In one example, based on the size and/or layout of the physical location, the administrator or other software user may define a first viewing zone near a left side of the physical location, a second viewing zone in the middle of the physical location, and a third viewing zone near a right side of the physical location. In some cases, the configuration may be based on the furniture and/or structure of the physical location. For example, where seats are permanently or otherwise regularly located in certain areas of the physical location but not others, viewing zones may be defined only for those areas which include the seats (and thus not for the other areas). In another example, where the physical space has a window through which someone outside of the physical space can observe the physical space, a viewing zone including the window and angled toward the display may be defined as a viewing zone from which to limit visibility of all visual content during a video conference.

Alternatively, the viewing angle determination tool 600 can determine the viewing angles on a dynamic basis, such as for each different video conference held from the physical location. For example, the viewing angle determination tool 600 can leverage a camera of the physical location to identify (e.g., using object detection) people at different locations within the physical location. The identification process does not uniquely identify or otherwise discern the identity of any person within the physical location, but rather is merely used to identify, within one or more images captured using the camera, objects recognizable as humans. Viewing zones may be established based on the locations at which people are identified. In another example, the viewing angle determination tool 600 can use device connections (e.g., established between individual user devices and a computing device of the physical location, for example, the computing device 502 shown in FIG. 5) to identify locations of those devices within the physical space. In some such cases, the computing device may use ultrasonic pairing to establish connections between individual user devices and the computing device of the physical location, in which an ultrasonic signal transmitted from a such user device to the computing device as part of the connection process may be evaluated to determine a direction of the user device relative to the computing device.

The viewing angle-based content determination tool 602 determines the visual content to simultaneously output to the different viewing zones determined by the viewing angle determination tool 600. To determine the visual content to output for a given viewing zone and thus based on a viewing angle corresponding to that viewing zone, the viewing angle-based content determination tool 602 uses information associated with one or more of the video conference, the conference participants determined as being within the viewing zone, or devices determined as being within that viewing zone. In some cases, role-based information for one or more conference participants can be leveraged to distinguish those conference participants over other conference participants. For example, the content for a viewing zone in which a known host of the video conference is determined to be located can be determined to include content intended only for the host of the video conference.

In some cases, input may be obtained from a user device associated with a conference participant to indicate one or more visual content preferences for the conference participant, or a data store storing records indicative of such preferences may be accessed to determine same. For example, a conference participant may connect their personal client device (e.g., a laptop) to the computing device within the physical location and transmit, from that personal client device, an indication of their visual content preferences indicating the visual content they want to be output for their viewing during the video conference. In some such cases, a web form or other in-take may be used to collect such input. In other such cases, a client application running at the personal client device may present a prompt or user interface (e.g., including a content mixer) for collecting such input. For example, visual content preferences may refer to the types of content (e.g., a gallery view layout of user interface tiles or screen share content) or formatting characteristics for such content (e.g., large font sizes or zoomed-in imagery).

In some cases, a person determined to be associated with an entity or team other than an entity or team with which the host of the video conference is associated may be recognized as an external party, in which case visual content different from that presented to parties of the same entity or team as the host of the video conference will be determined for the viewing zone within which the external party is located. In some cases, a default visual content type can be enforced for all conference participants in which case the visual content type will change where determinations to use other visual content are made on an individual conference participant basis. Thus, in some cases, the same visual content may be determined for multiple viewing zones. In some cases, based on a determination that there are no conference participants located in a given viewing zone (e.g., based on the object detection process performed by the viewing angle determination tool 600), the visual content for that viewing zone may be determined as background, stock, or signage content, or a determination may be made to not present any visual content for that viewing zone.

The content presentation tool 604 produces or otherwise causes a production of one or more signals for transmission, which, when processed, will cause an output of the visual content determined using the viewing angle-based content determination tool 602 for the subject viewing zones. The signal produced or caused to be produced by the content presentation tool 604 includes multiple video streams and indicates a juxtaposition of those multiple video streams. For example, the information indicative of the juxtaposition can be used to determine the vertical or horizontal banding order for the video streams as they are simultaneously output. This information, when processed by the 3DGL display, causes the separate video streams to be output using different but juxtaposed series of lenses, mirrors, or other componentry to enable the glasses-less three-dimensional experience for simultaneously outputting the different visual content to the different viewing zones. Alternatively, the signal produced or caused to be produced by the content presentation tool 604 may include a single video stream compiled (e.g., by the content presentation tool 604) using the various input video streams corresponding to the visual content. For example, the computing device on which the content presentation software 524 is run may receive separate video streams for each of the visual content. In cases where the video streams are compiled, they are compiled at the computing device before the compiled video stream, which represents the various visual content juxtaposed according to the subject viewing angles, is output to the 3DGL display.

The engagement monitoring tool 606 monitors engagements of in-person conference participants within the physical location with the visual content presented to them at one or more times throughout the subject video conference. In particular, the engagement monitoring tool 606 may leverage a video stream from a camera within the physical location to determine percentages of time during which the conference participants within a viewing zone, anonymized so as to avoid collecting any personal information about those conference participants, are looking at the visual content output to that viewing zone (e.g., using eye gaze detection). Where the engagement for a viewing zone is below a threshold percentage (e.g., at all or for threshold period of time), the engagement monitoring tool 606 may cause the viewing angle-based content determination tool 602 to determine different visual content for the viewing zone, in an effort to re-engage the conference participants within that viewing zone. In some cases, information associated with monitored engagements above and/or below a threshold may be recorded and stored within a data store, for example, for use in determining future visual content preferences for the subject conference participants or for general conference participants.

The device interface tool 608 interfaces with one or more devices that may directly or indirectly communicate with the computing device on which the content presentation software 524 runs. A device which may be in communication via the device interface tool 608 may be a personal computing device of a conference participant or an audio and/or visual device within the physical space. For example, where conference participants are determined to use their own personal audio output devices (e.g., headphones), the device interface tool 608 may cause an audio stream associated with the visual content for a given viewing angle to be output to the personal audio output device of a conference participant within that viewing zone. In another example, the device may be a companion device connected to the video conference, in which case some or all of the visual content determined for the viewing zone in which the companion device is located may be output for presentation at the companion device instead of or in addition to at the 3DGL display. In some such cases, a presentation of some or all of that visual content (e.g., just a chat message window) may be switched from the 3DGL display to the companion device upon a determination that a new person has entered or is within a threshold space (e.g., N feet or meters) of the viewing zone for which the visual content is output. In yet another example, the device may be another display, and the device interface tool 608 can control an output of secondary content at that other display. For example, environmental content, such as depicting company imagery or nature imagery, may be output to enhance the in-person experience for the video conference. In some such cases, multiple other displays may be used.

Although the tools 600 through 608 are shown as separate tools, in some implementations, two or more of the tools 600 through 608 may be combined into a single tool. Although the tools 600 through 608 are shown as functionality of the content presentation software 524 as a single piece of software, in some implementations, some or all of the tools 600 through 608 may exist outside of the content presentation software 524. Similarly, while the content presentation software 524 is shown and described as being run at the computing device 502 separate from the client application 518, other implementations are possible. For example, the client application 518 may in some cases include the content presentation software 524. In another example, the content presentation software 524 may be implemented at the server device 510 or another server device used with the system 500. In some such cases, the conferencing software 516 may include the content presentation software 524.

In some implementations, the content presentation software 524 may be adapted into the virtual reality use case. For example, rather than determine content to present as visual output for a given conference participant based on their viewing angle and thus viewing zone relative to a display within a physical location, in a virtual reality use case, the content to present may be determined based on the video conference and/or the participant. For example, participants who are grouped into a first sub-conference (e.g., a first breakout room) may be presented with first visual content while participants who are grouped into a second sub-conference (e.g., a second breakout room) may be presented with second visual content.

Figure 7A:
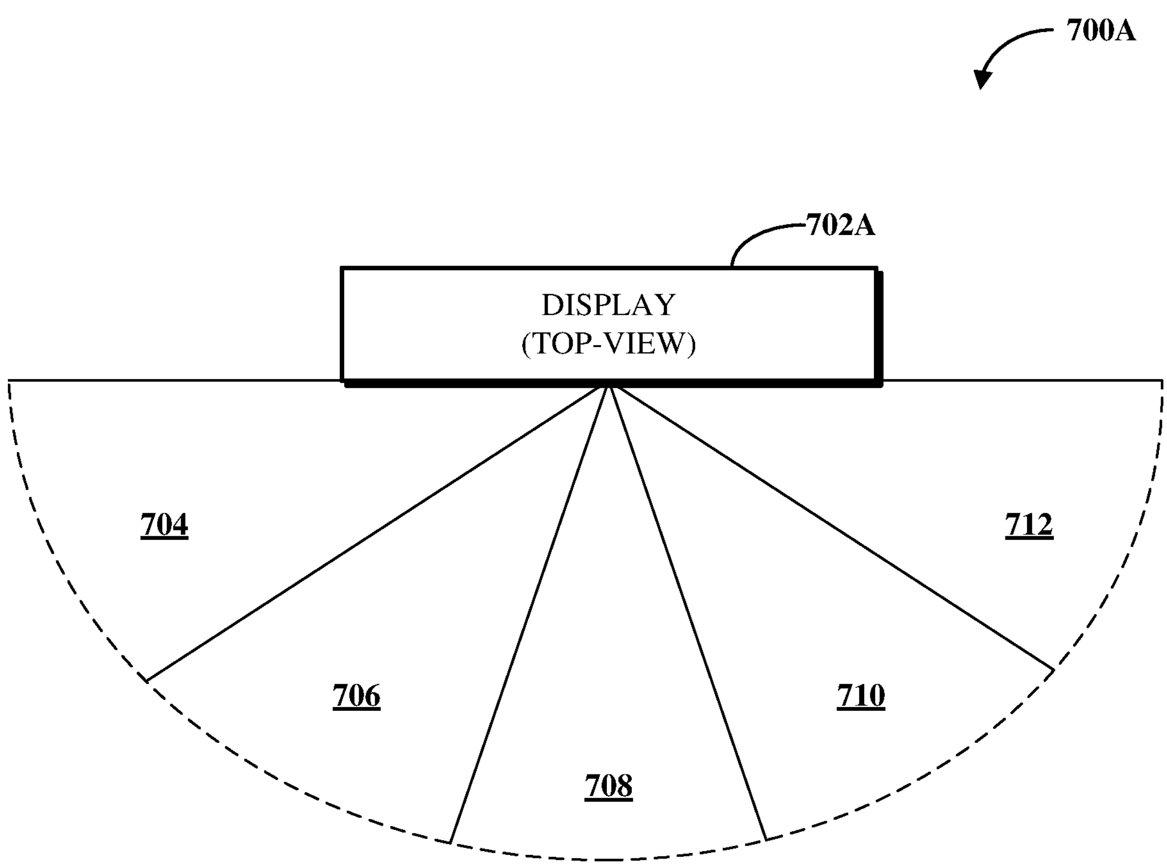
FIGS. 7A-C are illustrations of examples of content presentation according to viewing angles relative to a display within a physical location.

Example use cases are now described with reference to FIGS. 7A-C, which are illustrations of examples of content presentation according to viewing angles relative to a display within a physical location. Referring first to FIG. 7A, in a first example use case 700A, a display 702A (e.g., a 3DGL display, such as the 3DGL display 506 shown in FIG.

5) is seen from a top-view perspective. Similarly from a top-view perspective are viewing zones 704 through 712, each corresponding to a different viewing angle and consecutively arranged in a counter-clockwise manner from a left side to a right side of the display 702A. Different visual content is presented to conference participants within each of the different viewing zones 704 through 712 based on the viewing angles associated therewith. For example, because the viewing zone 708 is directly in front of the display 702, a gallery view of the subject video conference may be visible to any conference participants within the viewing zone 708. A shared screen view may be visible to any conference participants within the viewing zone 706, while a gallery view with a private chat with messages between two or more participants may be visible to any conference participants within the viewing zone 710. Because the viewing zones 704 and 712 are at the far edges of the 180 degree greater viewing area for the display 702, a background, stock, or signage image may be visible to any conference participants within the viewing zones 704 and 712.

To further illustrate this example, the display 702A may be located in a conference room (i.e., the physical location 508 shown in FIG. 5, in this example) of an office premises and used for a video conference between in-person conference participants within the conference room and remote conference participants external to the conference room. The host of the video conference sits in a seat within the viewing zone 710 and is thus identified (e.g., based on one or more and/or device identification techniques) as being located within the viewing zone 710. A presenter leading a discussion stands within the viewing zone 706 and is similarly identified as being located there. Other conference participants are identified as sitting or standing within the viewing zone 708. Because the host is in the viewing zone 710, a viewing angle associated with the viewing zone 710 is used to cause certain content for the host (e.g., private chat messages) to be visible within the viewing zone 710 and for the visibility of that content within other viewing zones to be limited accordingly. Similarly, because the presenter is in the viewing zone 706, a viewing angle associated with the viewing zone 706 is used to cause certain content for the presenter (e.g., a slideshow including notes for their presentation) to be visible within the viewing zone 706 and for the visibility of that content within other viewing zones to be limited accordingly. Finally, other conference participants, who are identified as being within the viewing zone 708, may, based on the viewing angle associated with the viewing zone 708, be presented with certain content for the general video conference group (e.g., a gallery view layout of user interface tiles for the various conference participants), the visibility of which may be limited outside of the viewing zone 708 accordingly.

Figure 7B:
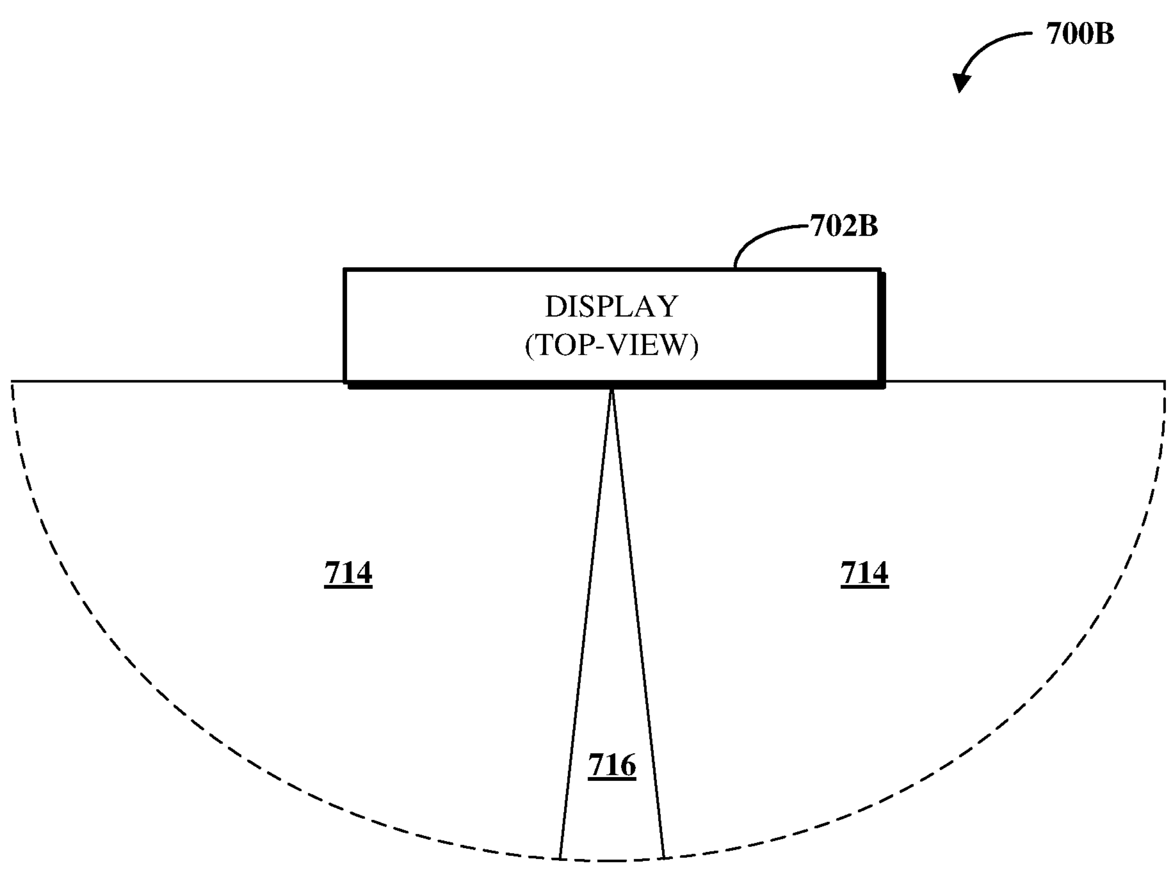

Referring next to FIG. 7B, in a second example use case, a display 702B (e.g., a 3DGL display, such as the 3DGL display 506 shown in FIG. 5) is again seen from a top-view perspective. Similarly from a top-view perspective are viewing zones 714 and 716, each corresponding to different viewing angles, in which the viewing zone 716 is in the middle of the physical location and the viewing zone 714 is on both the left and right sides of the viewing zone 716. Different visual content is presented to conference participants within each of the viewing zones 714 and 716, such that participants within the viewing zone 716 would see content which is different from the content that participants in either part of the viewing zone 714 would see. For example, one or more participants who are leading a presentation may be standing or sitting within the viewing zone 716 while other participants who are listening to and watching the presentation may be standing or sitting within the viewing zone 714. The visual content presented to the one or more participants within the viewing zone 716 may include a copy of lecture notes, slides, or the like which those one or more participants can leverage without having to fumble with physical notes or otherwise look away from the display. For example, the presenting one or more participants, because they are looking directly at the display and thus likely at a camera connected to or otherwise used with the display (e.g., the camera 504 shown in FIG. 5), may simply appear to remote conference participants as if they are looking directly at the display to see other conference participants instead of checking their notes. The participants within the viewing zone 714 may simply see shared content or a gallery view of user interface tiles for the various conference participants connected to the video conference. Other example use cases may involve competition formats, where a judge is within the viewing zone 716 and competitors are within the viewing zone 714. In some cases, the content presented within the viewing zone 716 may be depicted as annotations over the content separately but simultaneously presented within the viewing zone 714.

Figure 7C:
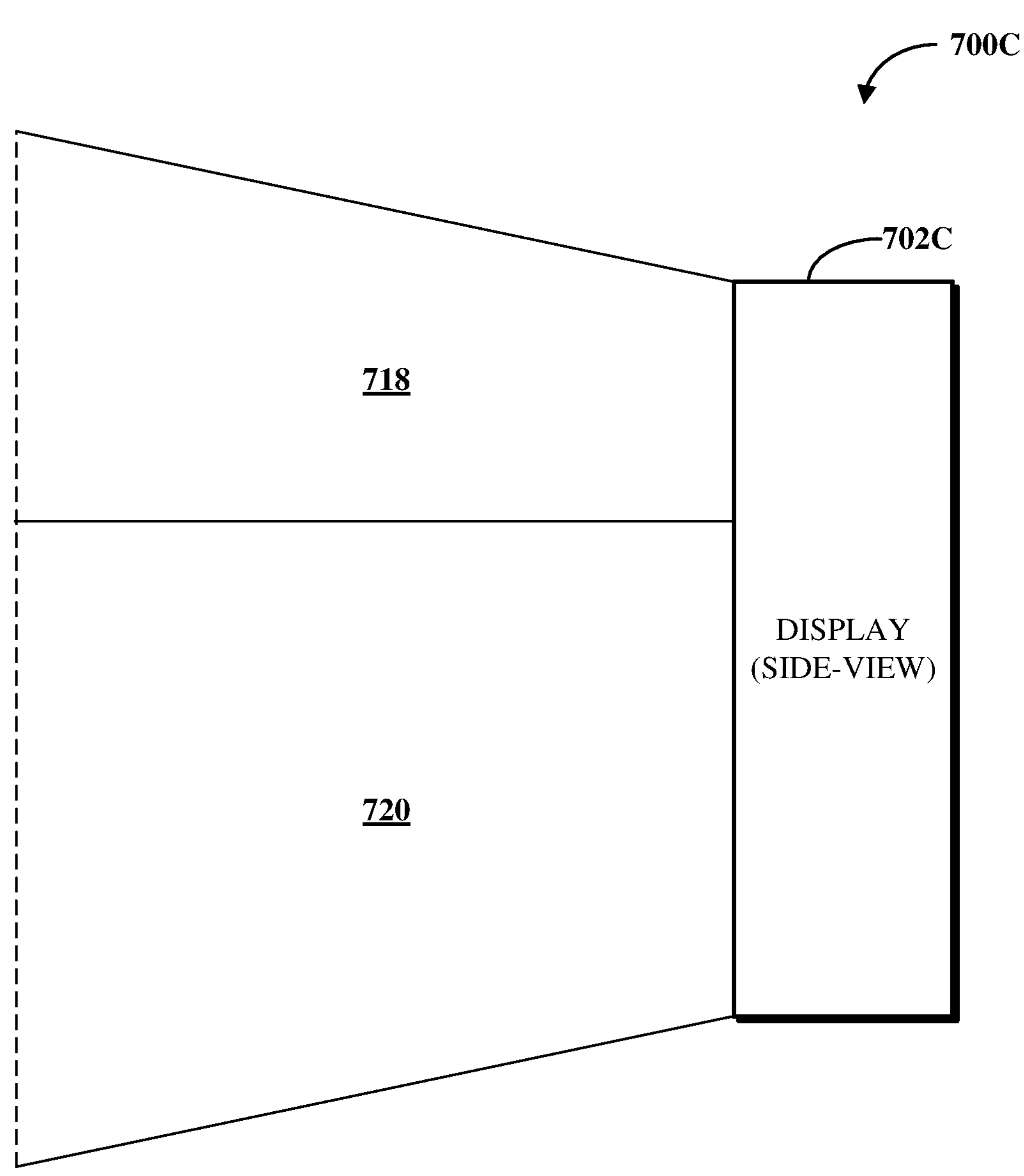

Referring finally to FIG. 7C, in a third example use case, a display 702C (e.g., a 3DGL display, such as the 3DGL display 506 shown in FIG. 5) is seen from a side-view perspective this time. Similarly from a side-view perspective are viewing zones 718 and 720, each corresponding to different viewing angles, in which the viewing zone 718 is above the viewing zone 720. The different visual content output at the display 702C is thus horizontally banded such that different visual content will be visible based on the viewing height of the different participants from wherever they may be within the physical location. For example, in an educational setting, a teacher may be standing while speaking with the students in their class, who are seated at desks. Because the students are seated and thus at effectively similar viewing heights within the viewing zone 720, they are presented with content intended for them (e.g., educational materials associated with a lesson plan being given by the teacher). However, because the teacher is standing and thus is at a viewing height above that of the viewing zone 720, the teacher is instead presented, within the viewing zone 718, with different content than that presented in the viewing zone 720. For example, the content presented in the viewing zone 718 may include lesson plan notes for aiding the teacher in giving their lesson. In some cases, those notes may be depicted as annotations on top of the content presented to the students within the viewing zone 718.

Figure 8:
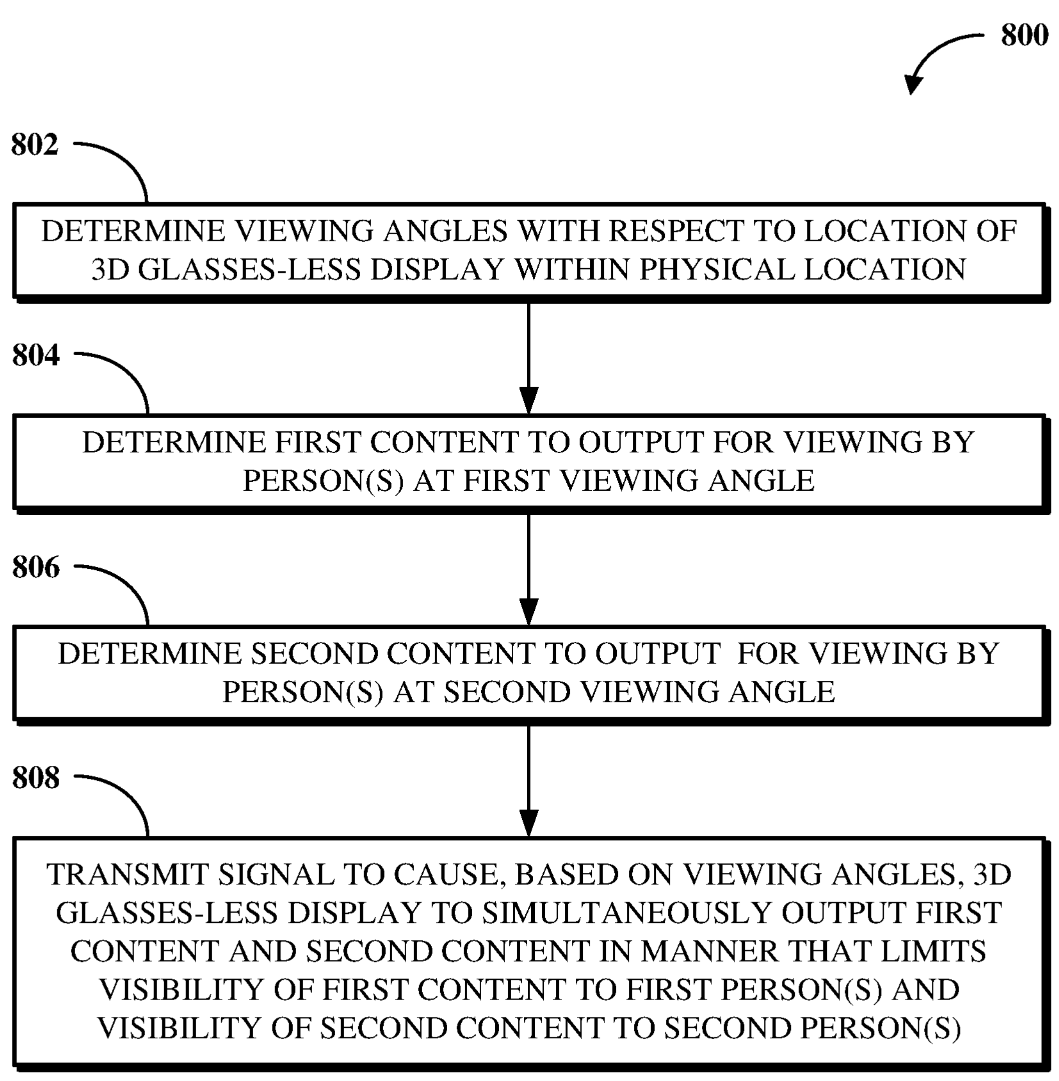
FIG. 8 is a flowchart of an example of a technique for viewing angle-based content presentation.

To further describe some implementations in greater detail, reference is next made to examples of techniques which may be performed by or using a system for viewing angle-based content presentation. FIG. 8 is a flowchart of an example of a technique 800 for viewing angle-based content presentation.

The technique 800 can be executed using computing devices, such as the systems, hardware, and software described with respect to FIGS. 1-7C. The technique 800 can be performed, for example, by executing a machine-readable program or other computer-executable instructions, such as routines, instructions, programs, or other code. The steps, or operations, of the technique 800 and/or another technique, method, process, or algorithm described in connection with the implementations disclosed herein can be implemented directly in hardware, firmware, software executed by hardware, circuitry, or a combination thereof. For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, viewing angles are determined with respect to a 3DGL display within a physical location. Each of the viewing angles corresponds to one of multiple viewing zones within the physical location. The viewing angles may be static based, for example, on one or more characteristics of the physical location. In such a case, determining the viewing angles can include determining to use certain viewing angles of a set of predetermined viewing angles for the physical location. For example, viewing zones within which at least one conference participant is detected can be identified and their corresponding viewing angles used. Alternatively, the viewing angles may be dynamically determined for the subject video conference, for example, based the specific conference participants attending the video conference. In such a case, determining the viewing angles can include determining the various viewing angles based on one or more of the conference participants within the physical location or devices of those conference participants.

At 804, first content to output for viewing at a first viewing angle of the viewing angles is determined. A first set of the conference participants is determined to be located within a viewing zone corresponding to the first viewing angle. The first set of the conference participants may include one or more conference participants. In some cases, a determination can be made as to whether the first set of the conference participants are associated with at least one of a same team or a same organization, in which the outcome of the determination may control the determination of the first content.

At 806, second content to output for viewing at a second viewing angle of the viewing angles is determined. A second set of the conference participants is determined to be located within a viewing zone corresponding to the second viewing angle. The second set of the conference participants may include one or more conference participants. In some cases, as with the first set of the conference participants, a determination can be made as to whether the second set of the conference participants are associated with at least one of a same team or a same organization, in which the outcome of the determination may control the determination of the second content.

At 808, a signal is transmitted to cause the 3DGL display to simultaneously output, based on the viewing angles, the first content and the second content in a manner that limits visibility of the first content to the one or more people within the viewing zone corresponding to the first viewing angle and that limits visibility of the second content to the one or more people within the viewing zone corresponding to the second viewing angle. The signal is produced based on the first content and the second content. The signal is configured to cause the first content to be visible to the first set of the conference participants located within the first viewing zone (and thus at the first viewing angle) and to cause the second content to be visible to the second set of the conference participants located within the second viewing zone (and thus at the second viewing angle). The first content and the second content are simultaneously output using the signal. For example, the first content and the second content may be synthesized into a combined output having a layout arranged based on the viewing angles, and the combined output may then be caused for output at the 3DGL display. In another example, the first content and the second content may be separately maintained within their own video streams and those video streams may be output in a juxtaposed manner at the 3DGL display. In some cases, the viewing angles are juxtaposed vertical bands and thus different content is visible at different viewing zones within a physical location regardless of viewing heights of the conference participants within those viewing zones. In some cases, the viewing angles are juxtaposed horizontal bands and thus different content is visible at different viewing zones within a physical location according to different viewing heights rather than different locations about a floor.

The content described with respect to the technique 800 is generally recognized as being visual content. However, in some implementations, the content may also include audio content. Thus, in at least some implementations, audio content may be concurrently presented for consumption within a given viewing zone alongside the visual content determined therefor. Furthermore, while the technique 800 is described relative to first and second sets of conference participants and thus to first and second viewing angles and viewing zones, in some implementations, other numbers of conference participant sets, viewing angles, and viewing zones may be used.

In some implementations, the technique 800 may include changing a layout of portions of the first content or the second content output at the 3DGL display based on input obtained from one or more devices associated with the first or second set of the conference participants, as applicable. For example, a companion device may output a content mixer that, when interacted with by a conference participant, causes a change to the content output for the viewing zone within which that conference participant is located.

In some implementations, the technique 800 may include changing a layout of portions of the first or second content output at the 3DGL display based on a level of engagement associated with the first or second set of the conference participants, as applicable. For example, a camera within the physical location can monitor for conference participant engagement within a given viewing zone and cause a change in the content output for viewing with that viewing zone where the engagement is below a threshold.

The implementations of this disclosure correspond to methods, non-transitory computer readable media, apparatuses, systems, devices, and the like. In some implementations, a method comprises: determining, based on a location of each conference participant within a physical location that includes a three-dimensional glasses-less display, viewing angles of the conference participants with respect to the three-dimensional glasses-less display; determining first content to output at the three-dimensional glasses-less display for viewing by a first set of the conference participants; determining second content to output at the three-dimensional glasses-less display for viewing by a second set of the conference participants; and causing, based on the viewing angles of the conference participants, the three-dimensional glasses-less display to simultaneously output the first content and the second content in a manner that limits visibility of the first content to the first set of the conference participants and visibility of the second content to the second set of the conference participants. In some implementations, a non-transitory computer readable medium stores instructions operable to cause one or more processors to perform operations comprising: determining, based on a location of each conference participant within a physical location that includes a three-dimensional glasses-less display, viewing angles of the conference participants with respect to the three-dimensional glasses-less display; determining first content to output at the three-dimensional glasses-less display for viewing by a first set of the conference participants; determining second content to output at the three-dimensional glasses-less display for viewing by a second set of the conference participants; and causing, based on the viewing angles of the conference participants, the three-dimensional glasses-less display to simultaneously output the first content and the second content in a manner that limits visibility of the first content to the first set of the conference participants and visibility of the second content to the second set of the conference participants. In some implementations, a system comprises one or more memories and one or more processors configured to execute instructions stored in the one or more memories to: determine, based on a location of each conference participant within a physical location that includes a three-dimensional glasses-less display, viewing angles of the conference participants with respect to the three-dimensional glasses-less display; determine first content to output at the three-dimensional glasses-less display for viewing by a first set of the conference participants; determine second content to output at the three-dimensional glasses-less display for viewing by a second set of the conference participants; and cause, based on the viewing angles of the conference participants, the three-dimensional glasses-less display to simultaneously output the first content and the second content in a manner that limits visibility of the first content to the first set of the conference participants and visibility of the second content to the second set of the conference participants.

In some implementations of the method, non-transitory computer readable medium, or system, each of the viewing angles corresponds to one of multiple viewing zones within the physical location, and causing the three-dimensional glasses-less display to simultaneously output the first content and the second content in the manner that limits visibility of the first content to the first set of the conference participants and visibility of the second content to the second set of the conference participants comprises: causing, at the three-dimensional glasses-less display, a visible output of the first content within a first viewing zone of the multiple viewing zones; and causing, at the three-dimensional glasses-less display, a visible output of the second content within a second viewing zone of the multiple viewing zones.

In some implementations of the method, non-transitory computer readable medium, or system, determining the first content to output at the three-dimensional glasses-less display for viewing by the first set of the conference participants comprises: determining that the first set of the conference participants are associated with at least one of a same team or a same organization.

In some implementations of the method, non-transitory computer readable medium, or system, causing the three-dimensional glasses-less display to simultaneously output the first content and the second content in the manner that limits visibility of the first content to the first set of the conference participants and visibility of the second content to the second set of the conference participants comprises: synthesizing the first content and the second content into a combined output having a layout arranged based on the viewing angles; and causing an output, at the three-dimensional glasses-less display, of the combined output.

In some implementations of the method, non-transitory computer readable medium, or system, the method comprises, the operations comprise, and the one or more processors are configured to execute the instructions for: changing a layout of portions of the first content output at the three-dimensional glasses-less display based on input obtained from one or more devices associated with the first set of the conference participants.

In some implementations of the method, non-transitory computer readable medium, or system, the method comprises, the operations comprise, and the one or more processors are configured to execute the instructions for: changing a layout of portions of the first content output at the three-dimensional glasses-less display based on a level of engagement associated with the first set of the conference participants.

In some implementations of the method, non-transitory computer readable medium, or system, one of the viewing angles corresponds to a camera, and the method comprises, the operations comprise, and the one or more processors are configured to execute the instructions for: causing the three-dimensional glasses-less display to output third content, simultaneously with the output of the first content and the second content, in a manner that limits visibility of the third content to the camera.

In some implementations of the method, non-transitory computer readable medium, or system, the second content omits or obscures sensitive information included in the first content.

In some implementations of the method, non-transitory computer readable medium, or system, the viewing angles are static based on one or more characteristics of the physical location, and determining the viewing angles comprises: determining the first viewing angle and the second viewing angle as viewing angles from a set of predetermined viewing angles for the physical location.

In some implementations of the method, non-transitory computer readable medium, or system, the viewing angles are dynamically determined for a video conference attended by the first set of the conference participants and the second set of the conference participants, and wherein determining the viewing angles comprises: determining the first viewing angle and the second viewing angle based on one or more of the first set of the conference participants and the second set of the conference participants or devices of the first set of the conference participants and the second set of the conference participants.

In some implementations of the method, non-transitory computer readable medium, or system, the viewing angles are juxtaposed vertical bands.

In some implementations of the method, non-transitory computer readable medium, or system, the viewing angles are juxtaposed horizontal bands.

In some implementations of the method, non-transitory computer readable medium, or system, the first content includes visual content intended for all of the conference participants and the second content includes sensitive content intended for only the second set of the conference participants.

In some implementations of the method, non-transitory computer readable medium, or system, the first content is also simultaneously output for viewing by a third set of the conference participants located in a different viewing zone than the first set of the conference participants.

In some implementations of the method, non-transitory computer readable medium, or system, the method comprises, the operations comprise, and the one or more processors are configured to execute the instructions for: monitoring an engagement of the first set of the conference participants with the first content; and determining to change a layout of the first content based on the engagement.

In some implementations of the method, non-transitory computer readable medium, or system, the method comprises, the operations comprise, and the one or more processors are configured to execute the instructions for: changing the first content based on input received from a device associated with the first set of the conference participants.

In some implementations of the method, non-transitory computer readable medium, or system, the method comprises, the operations comprise, and the one or more processors are configured to execute the instructions for: determining to omit a presentation of content for a viewing angle along an edge of the physical location.

In some implementations of the method, non-transitory computer readable medium, or system, the viewing angles each correspond to a different viewing zone within the physical location, wherein the first set of the conference participants are in a first viewing zone and the second set of the conference participants are in a second viewing zone.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

determining, based on a first ultrasonic signal transmitted from a first user device at a first location within a physical location that includes a three-dimensional glasses-less display, a first viewing angle with respect to the three-dimensional glasses-less display of a first set of conference participants associated with the first user device;

determining, based on a second ultrasonic signal transmitted from a second user device at a second location within the physical location, a second viewing angle with respect to the three-dimensional glasses-less display of a second set of conference participants associated with the second user device;

determining first content to output at the three-dimensional glasses-less display for viewing by the first set of the conference participants;

determining second content to output at the three-dimensional glasses-less display for viewing by the second set of the conference participants;

determining to limit visibility of all content including the first content and the second content for a third viewing angle with respect to the three-dimensional glasses-less display based on a third location corresponding to the third viewing angle including a window of the physical location, wherein one or more conference participants other than of the first set of conference participants or the second set of conference participants are located within the third location; and causing, based on the first viewing angle and the second viewing angle, the three-dimensional glasses-less display to simultaneously output the first content and the second content in a manner that limits visibility of the first content to the first set of the conference participants and visibility of the second content to the second set of the conference participants.

2. The method of claim 1, wherein each of the first viewing angle and the second viewing angle corresponds to one of multiple viewing zones within the physical location, and wherein causing the three-dimensional glasses-less display to simultaneously output the first content and the second content in the manner that limits visibility of the first content to the first set of the conference participants and visibility of the second content to the second set of the conference participants comprises:

causing, at the three-dimensional glasses-less display, a visible output of the first content within a first viewing zone of the multiple viewing zones; and causing, at the three-dimensional glasses-less display, a visible output of the second content within a second viewing zone of the multiple viewing zones.

3. The method of claim 1, wherein determining the first content to output at the three-dimensional glasses-less display for viewing by the first set of the conference participants comprises:

determining that the first set of the conference participants are associated with at least one of a same team or a same organization.

4. The method of claim 1, wherein causing the three-dimensional glasses-less display to simultaneously output the first content and the second content in the manner that limits visibility of the first content to the first set of the conference participants and visibility of the second content to the second set of the conference participants comprises:

synthesizing the first content and the second content into a combined output having a layout arranged based on the first viewing angle and the second viewing angle; and causing an output, at the three-dimensional glasses-less display, of the combined output.

5. The method of claim 1, comprising:

changing a layout of portions of the first content output at the three-dimensional glasses-less display based on input obtained from one or more devices associated with the first set of the conference participants.

6. The method of claim 1, comprising:

changing a layout of portions of the first content output at the three-dimensional glasses-less display based on a level of engagement associated with the first set of the conference participants.

7. The method of claim 1, wherein one of the viewing angles corresponds to a camera, the method comprising:

causing the three-dimensional glasses-less display to output third content, simultaneously with the output of the first content and the second content, in a manner that limits visibility of the third content to the camera.

8. The method of claim 1, wherein the second content omits or obscures sensitive information included in the first content.

9. The method of claim 1, wherein the viewing angles are static based on one or more characteristics of the physical location, and wherein determining the viewing angles comprises:

determining the first viewing angle and the second viewing angle as viewing angles from a set of predetermined viewing angles for the physical location.

10. The method of claim 1, wherein the viewing angles are dynamically determined for a video conference attended by the first set of the conference participants and the second set of the conference participants, and wherein determining the viewing angles comprises:

determining the first viewing angle and the second viewing angle based on one or more of the first set of the conference participants and the second set of the conference participants or devices of the first set of the conference participants and the second set of the conference participants.

11. The method of claim 1, wherein the viewing angles are juxtaposed vertical bands.

12. The method of claim 1, wherein the viewing angles are juxtaposed horizontal bands.

13. A non-transitory computer readable medium storing instructions operable to cause one or more processors to perform operations comprising:

determining, based on a first ultrasonic signal transmitted from a first user device at a first location within a physical location that includes a three-dimensional glasses-less display, a first viewing angle with respect to the three-dimensional glasses-less display of a first set of conference participants associated with the first user device;

determining, based on a second ultrasonic signal transmitted from a second user device at a second location within the physical location, a second viewing angle with respect to the three-dimensional glasses-less display of a second set of conference participants associated with the second user device;

determining first content to output at the three-dimensional glasses-less display for viewing by the first set of the conference participants;

determining second content to output at the three-dimensional glasses-less display for viewing by the second set of the conference participants;

determining to limit visibility of all content including the first content and the second content for a third viewing angle with respect to the three-dimensional glasses-less display based on a third location corresponding to the third viewing angle including a window of the physical location, wherein one or more conference participants other than of the first set of conference participants or the second set of conference participants are located within the third location; and causing, based on the first viewing angle and the second viewing angle, the three-dimensional glasses-less display to simultaneously output the first content and the second content in a manner that limits visibility of the first content to the first set of the conference participants and visibility of the second content to the second set of the conference participants.

14. The non-transitory computer readable medium of claim 13, wherein the first content includes visual content intended for all of the conference participants and the second content includes sensitive content intended for only the second set of the conference participants.

15. The non-transitory computer readable medium of claim 13, wherein the first content is also simultaneously output for viewing by a third set of the conference participants located in a different viewing zone than the first set of the conference participants.

16. A system, comprising:

one or more memories; and one or more processors configured to execute instructions stored in the one or more memories to:

determine, based on a first ultrasonic signal transmitted from a first user device at a first location within a physical location that includes a three-dimensional glasses-less display, a first viewing angle with respect to the three-dimensional glasses-less display of a first set of conference participants associated with the first user device;

determine, based on a second ultrasonic signal transmitted from a second user device at a second location within the physical location, a second viewing angle with respect to the three-dimensional glasses-less display of a second set of conference participants associated with the second user device;

determine first content to output at the three-dimensional glasses-less display for viewing by the first set of the conference participants;

determine second content to output at the three-dimensional glasses-less display for viewing by the second set of the conference participants;

determine to limit visibility of all content including the first content and the second content for a third viewing angle with respect to the three-dimensional glasses-less display based on a third location corresponding to the third viewing angle including a window of the physical location, wherein one or more conference participants other than of the first set of conference participants or the second set of conference participants are located within the third location; and cause, based on the first viewing angle and the second viewing angle, the three-dimensional glasses-less display to simultaneously output the first content and the second content in a manner that limits visibility of the first content to the first set of the conference participants and visibility of the second content to the second set of the conference participants.

17. The system of claim 16, wherein the one or more processors are configured to execute the instructions to:

monitor an engagement of the first set of the conference participants with the first content; and determine to change a layout of the first content based on the engagement.

18. The system of claim 16, wherein the one or more processors are configured to execute the instructions to:

change the first content based on input received from a device associated with the first set of the conference participants.

19. The system of claim 16, wherein, to determine to limit the visibility of all content including the first content and the second content for the third viewing angle with respect to the three-dimensional glasses-less display based on the third location corresponding to the third viewing angle including the window of the physical location, the one or more processors are configured to execute the instructions to:

determine to omit a presentation of content for a viewing angle along an edge of the physical location, wherein the edge includes the window.

20. The system of claim 16, wherein the viewing angles each correspond to a different viewing zone within the physical location, wherein the first set of the conference participants are in a first viewing zone and the second set of the conference participants are in a second viewing zone.

* * * * *